(12) United States Patent
Suyama

(10) Patent No.: US 11,362,740 B2
(45) Date of Patent: Jun. 14, 2022

(54) POWER OVER FIBER SYSTEM

(71) Applicant: KYOCERA Corporation, Kyoto (JP)

(72) Inventor: Takehiko Suyama, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/271,599

(22) PCT Filed: May 21, 2020

(86) PCT No.: PCT/JP2020/020045
§ 371 (c)(1),
(2) Date: Feb. 26, 2021

(87) PCT Pub. No.: WO2021/024574
PCT Pub. Date: Feb. 11, 2021

(65) Prior Publication Data
US 2021/0359759 A1    Nov. 18, 2021

(30) Foreign Application Priority Data
Aug. 2, 2019  (JP) .............................. JP2019-142678

(51) Int. Cl.
*H04B 10/80* (2013.01)
*H04B 10/25* (2013.01)
(Continued)

(52) U.S. Cl.
CPC ....... *H04B 10/807* (2013.01); *H04B 10/2589* (2020.05); *H04B 10/503* (2013.01);
(Continued)

(58) Field of Classification Search
CPC ........ H04B 10/806–808; H04B 10/564; H04B 10/506; H04B 10/691; H04B 10/807; H04B 10/2589; H04B 10/503
See application file for complete search history.

(56) References Cited

U.S. PATENT DOCUMENTS

| 7,941,022 B1 | 5/2011 | Schaffner et al. |
| 2004/0227057 A1* | 11/2004 | Tuominen ............ H04B 10/807 250/205 |
| 2011/0278479 A1 | 11/2011 | Chan et al. |

FOREIGN PATENT DOCUMENTS

| CN | 101719670 A | 6/2010 |
| CN | 104601272 A | 5/2015 |

(Continued)

*Primary Examiner* — Casey L Kretzer
(74) *Attorney, Agent, or Firm* — Hauptman Ham, LLP

(57) ABSTRACT

A power over fiber system includes a power sourcing equipment, a powered device, an optical fiber cable and a controller. The power sourcing equipment includes semiconductor lasers. The semiconductor lasers output feed light of different wavelengths by oscillating with electric power. The powered device includes photoelectric conversion elements. The photoelectric conversion elements have different photoelectric conversion efficiencies and convert the feed light output from the power sourcing equipment into electric power with their respective photoelectric conversion efficiencies. The optical fiber cable transmits the feed light from the power sourcing equipment to the powered device. The controller performs a process of selecting and activating one of the semiconductor lasers and a process of selecting and activating one of the photoelectric conversion elements in order that the power over fiber system perform predetermined power supply.

12 Claims, 10 Drawing Sheets

(51) Int. Cl.
  *H04B 10/50* (2013.01)
  *H04B 10/564* (2013.01)
  *H04B 10/69* (2013.01)

(52) U.S. Cl.
  CPC ......... *H04B 10/506* (2013.01); *H04B 10/564* (2013.01); *H04B 10/691* (2013.01)

(56) References Cited

FOREIGN PATENT DOCUMENTS

| | | | |
|---|---|---|---|
| JP | 2010135989 A | 6/2010 | |
| JP | 2013541234 A | 11/2013 | |
| JP | 2016225817 A | 12/2016 | |
| WO | 2011158283 A1 | 12/2011 | |

\* cited by examiner

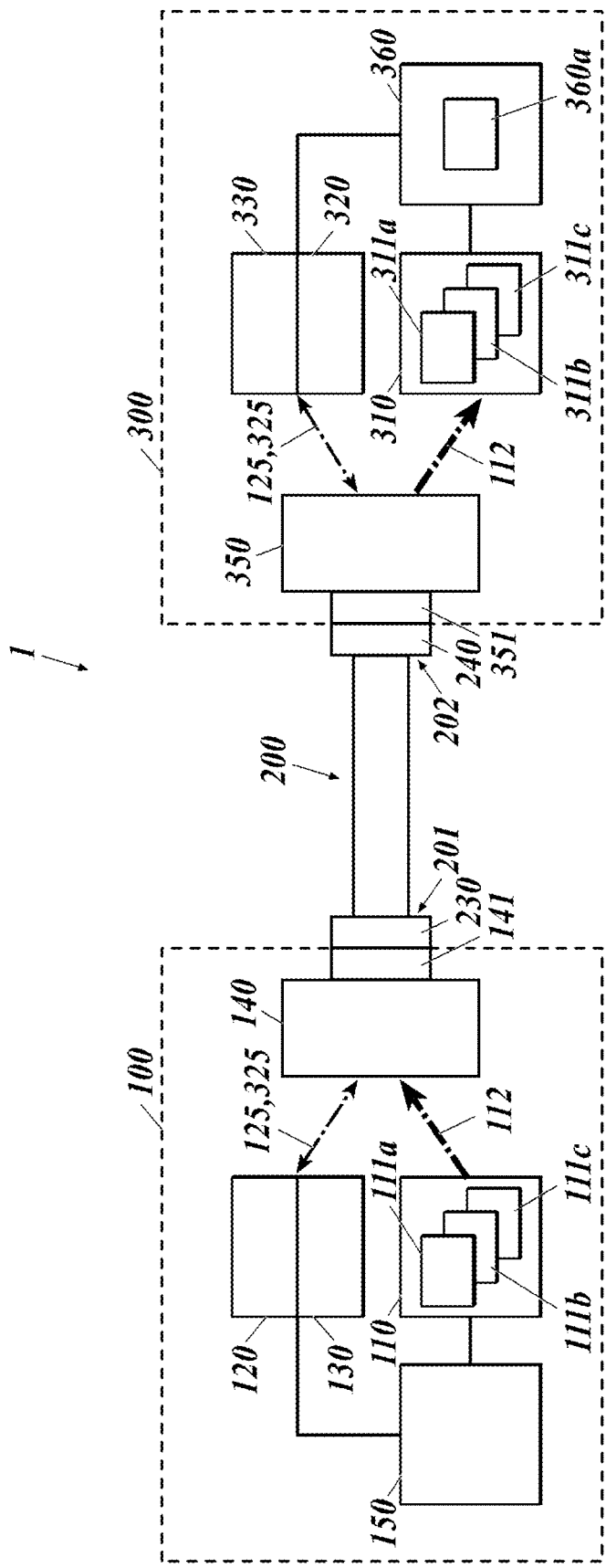

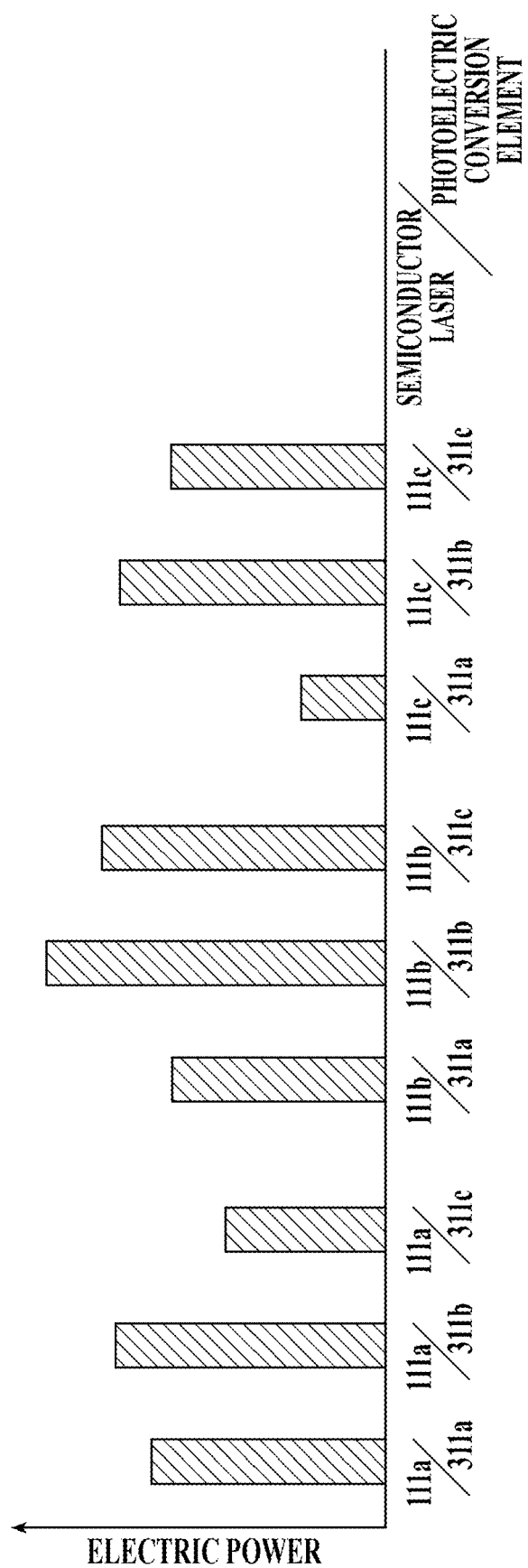

POWER OVER FIBER SYSTEM

RELATED APPLICATIONS

The present application is a National Phase of International Application Number PCT/JP2020/020045 filed May 21, 2020 and claims priority to Japanese Application Number 2019-142678 filed Aug. 2, 2019.

TECHNICAL FIELD

The present disclosure relates to optical power supply.

BACKGROUND ART

Recently, there has been studied an optical power supply system that converts electric power into light (called feed light), transmits the feed light, converts the feed light into electric energy, and uses the electric energy as electric power.

There is disclosed in Patent Literature 1 an optical communication device that includes: an optical transmitter that transmits signal light modulated with an electric signal and feed light for supplying electric power; an optical fiber including a core that transmits the signal light, a first cladding that is formed around the core, has a refractive index lower than that of the core, and transmits the feed light, and a second cladding that is formed around the first cladding, and has a refractive index lower than that of the first cladding; and an optical receiver that operates with electric power obtained by converting the feed light transmitted through the first cladding of the optical fiber, and converts the signal light transmitted through the core of the optical fiber into the electric signal.

CITATION LIST

Patent Literature

Patent Literature 1: JP 2010-135989 A

SUMMARY OF INVENTION

Problem to Solve

In the course of future improvement of a power over fiber system, the following is expected; an optical transmitter is provided with a new semiconductor laser in addition to a conventional semiconductor laser and/or an optical receiver is provided with a new photoelectric conversion element in addition to a conventional photoelectric conversion element. In such a case too, a power over fiber system is required to perform efficient power supply.

Solution to Problem

A power over fiber system of an aspect of the present disclosure is
a power over fiber system including: a power sourcing equipment including a plurality of semiconductor lasers that oscillate with electric power, thereby outputting feed light; a powered device including a plurality of photoelectric conversion elements that convert the feed light from the power sourcing equipment into electric power; and an optical fiber cable that transmits the feed light from the power sourcing equipment to the powered device,
wherein the power sourcing equipment includes the semiconductor lasers that output the feed light of different wavelengths,
wherein the powered device includes the photoelectric conversion elements having different photoelectric conversion efficiencies, and
wherein the power over fiber system further includes a controller that performs a process of selecting and activating one of the semiconductor lasers included in the power sourcing equipment and a process of selecting and activating one of the photoelectric conversion elements included in the powered device in order that the power over fiber system perform predetermined power supply.

The power over fiber system includes: a first data communication device including the power sourcing equipment; and a second data communication device including the powered device and performing optical communication with the first data communication device, and in the power over fiber system, the controller includes: a power-supplying-side controller included in the first data communication device and performing a process of switching the semiconductor lasers included in the power sourcing equipment to activate the one of the semiconductor lasers; and a power-receiving-side controller included in the second data communication device and performing a process of notifying, by the optical communication, the power-supplying-side controller of selection information for activating the one of the semiconductor lasers included in the power sourcing equipment and a process of switching the photoelectric conversion elements included in the powered device to activate the one of the photoelectric conversion elements.

In the power over fiber system,
the power-supplying-side controller performs a process of activating the semiconductor lasers included in the power sourcing equipment one by one in order, and notifying, by the optical communication, the power-receiving-side controller of information for identifying a semiconductor laser being activated, and
the power-receiving-side controller performs: a process of activating the photoelectric conversion elements included in the powered device one by one in order, and temporarily storing electric power data corresponding to respective combinations of the semiconductor lasers and the photoelectric conversion elements; a process of selecting electric power data satisfying a predetermined reference from among the stored electric power data; a process of notifying, by the optical communication, the power-supplying-side controller of the selection information to activate a semiconductor laser corresponding to the selected electric power data; and a process of switching the photoelectric conversion elements to activate a photoelectric conversion element corresponding to the selected electric power data.

BRIEF DESCRIPTION OF DRAWINGS

FIG. 9 is a block diagram of the power over fiber system (third example) according to the second embodiment of the present disclosure with the controller(s) (power-receiving-side controller and power-supplying-side controller) added.

FIG. 10 is a graph to explain the electric power data temporarily stored, in the third example.

DESCRIPTION OF EMBODIMENTS

Figure 1:
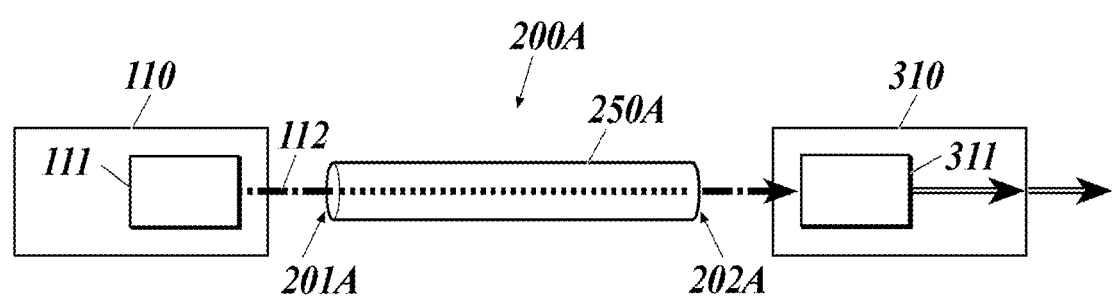
FIG. 1 is a block diagram of a power over fiber system according to a first embodiment of the present disclosure.

Hereinafter, embodiments of the present disclosure will be described with reference to the drawings.
(1) Outline of System First Embodiment As shown in FIG. 1, a power over fiber (PoF) system 1A (optical power supply system) of this embodiment includes a power sourcing equipment (PSE) 110, an optical fiber cable 200A and a powered device (PD) 310.

In the present disclosure, a power sourcing equipment converts electric power into optical energy and supplies (sources) the optical energy, and a powered device receives (draws) the supplied optical energy and converts the optical energy into electric power.

The power sourcing equipment 110 includes a semiconductor laser 111 for power supply.

The optical fiber cable 200A includes an optical fiber 250A that forms a transmission path of feed light.

The powered device 310 includes a photoelectric conversion element 311.

The power sourcing equipment 110 is connected to a power source, and electrically drives the semiconductor laser 111 and so forth.

The semiconductor laser 111 oscillates with the electric power from the power source, thereby outputting feed light 112.

The optical fiber cable 200A has one end 201A connectable to the power sourcing equipment 110 and the other end 202A connectable to the powered device 310 to transmit the feed light 112.

The feed light 112 from the power sourcing equipment 110 is input to the one end 201A of the optical fiber cable 200A, propagates through the optical fiber 250A, and is output from the other end 202A of the optical fiber cable 200A to the powered device 310.

The photoelectric conversion element 311 converts the feed light 112 transmitted through the optical fiber cable 200A into electric power. The electric power obtained by the conversion of the feed light 112 by the photoelectric conversion element 311 is driving power needed in the powered device 310. The powered device 310 is capable of outputting, for an external device(s), the electric power obtained by the conversion of the feed light 112 by the photoelectric conversion element 311.

Semiconductor materials of semiconductor regions of the semiconductor laser 111 and the photoelectric conversion element 311 are semiconductors having a laser wavelength being a short wavelength of 500 nm or less. The semiconductor regions exhibit light-electricity conversion effect.

Semiconductors having a laser wavelength being a short wavelength have a large band gap and a high photoelectric conversion efficiency, and hence improve photoelectric conversion efficiency at the power supplying side and the power receiving side in optical power supply, and improve optical power supply efficiency.

Hence, as the semiconductor materials, laser media having a laser wavelength (base wave) of 200 nm to 500 nm may be used. Examples thereof include diamond, gallium oxide, aluminum nitride and gallium nitride.

Further, as the semiconductor materials, semiconductors having a band gap of 2.4 eV or greater are used.

For example, laser media having a band gap of 2.4 eV to 6.2 eV may be used. Examples thereof include diamond, gallium oxide, aluminum nitride and gallium nitride.

Laser light having a longer wavelength tends to have a higher transmission efficiency, whereas laser light having a shorter wavelength tends to have a higher photoelectric conversion efficiency. Hence, when laser light is transmitted for a long distance, laser media having a laser wavelength (base wave) of greater than 500 nm may be used as the semiconductor materials, whereas when the photoelectric conversion efficiency is given priority, laser media having a laser wavelength (base wave) of less than 200 nm may be used as the semiconductor materials.

Any of these semiconductor materials may be used in one of the semiconductor laser 111 and the photoelectric conversion element 311. This improves the photoelectric conversion efficiency at either the power supplying side or the power receiving side, and improves the optical power supply efficiency.

Second Embodiment

Figure 2:
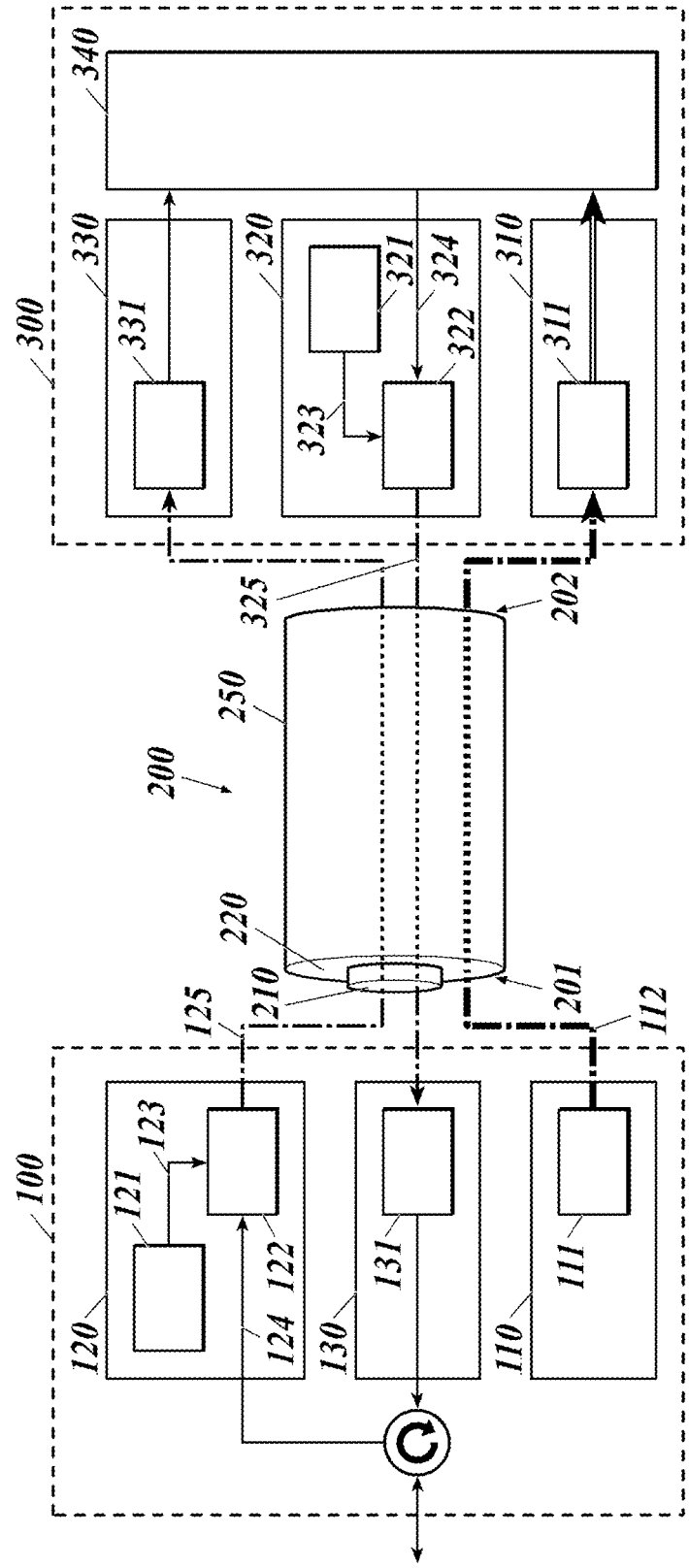
FIG. 2 is a block diagram of a power over fiber system according to a second embodiment of the present disclosure.

As shown in FIG. 2, a power over fiber (PoF) system 1 of this embodiment includes a power supply system through an optical fiber and an optical communication system therethrough, and includes: a first data communication device 100 including a power sourcing equipment (PSE) 110; an optical fiber cable 200; and a second data communication device 300 including a powered device (PD) 310.

The power sourcing equipment 110 includes a semiconductor laser 111 for power supply. The first data communication device 100 includes, in addition to the power sourcing equipment 110, a transmitter 120 and a receiver 130 for data communication. The first data communication device 100 corresponds to a data terminal equipment (DTE), a repeater or the like. The transmitter 120 includes a semiconductor laser 121 for signals and a modulator 122. The receiver 130 includes a photodiode 131 for signals.

The optical fiber cable 200 includes an optical fiber 250 including: a core 210 that forms a transmission path of signal light; and a cladding 220 that is arranged so as to surround the core 210 and forms a transmission path of feed light.

The powered device 310 includes a photoelectric conversion element 311. The second data communication device 300 includes, in addition to the powered device 310, a transmitter 320, a receiver 330 and a data processing unit 340. The second data communication device 300 corresponds to a power end station or the like. The transmitter 320 includes a semiconductor laser 321 for signals and a modulator 322. The receiver 330 includes a photodiode 331 for signals. The data processing unit 340 processes received signals. The second data communication device 300 is a node in a communication network. The second data communication device 300 may be a node that communicates with another node.

The first data communication device 100 is connected to a power source, and electrically drives the semiconductor laser 111, the semiconductor laser 121, the modulator 122, the photodiode 131 and so forth. The first data communication device 100 is a node in a communication network. The first data communication device 100 may be a node that communicates with another node.

The semiconductor laser 111 oscillates with the electric power from the power source, thereby outputting feed light 112.

The photoelectric conversion element 311 converts the feed light 112 transmitted through the optical fiber cable 200 into electric power. The electric power obtained by the conversion of the feed light 112 by the photoelectric conversion element 311 is driving power needed in the second data communication device 300, for example, driving power for the transmitter 320, the receiver 330 and the data processing unit 340. The second data communication device 300 may be capable of outputting, for an external device(s), the electric power obtained by the conversion of the feed light 112 by the photoelectric conversion element 311.

The modulator 122 of the transmitter 120 modulates laser light 123 output by the semiconductor laser 121 to signal light 125 on the basis of transmission data 124, and outputs the signal light 125.

The photodiode 331 of the receiver 330 demodulates the signal light 125 transmitted through the optical fiber cable 200 to an electric signal, and outputs the electric signal to the data processing unit 340. The data processing unit 340 transmits data of the electric signal to a node, and also receives data from the node and outputs the data to the modulator 322 as transmission data 324.

The modulator 322 of the transmitter 320 modulates laser light 323 output by the semiconductor laser 321 to signal light 325 on the basis of the transmission data 324, and outputs the signal light 325.

The photodiode 131 of the receiver 130 demodulates the signal light 325 transmitted through the optical fiber cable 200 to an electric signal, and outputs the electric signal. Data of the electric signal is transmitted to a node, whereas data from the node is the transmission data 124.

The feed light 112 and the signal light 125 from the first data communication device 100 are input to one end 201 of the optical fiber cable 200, propagate through the cladding 220 and the core 210, respectively, and are output from the other end 202 of the optical fiber cable 200 to the second data communication device 300.

The signal light 325 from the second data communication device 300 is input to the other end 202 of the optical fiber cable 200, propagates through the core 210, and is output from the one end 201 of the optical fiber cable 200 to the first data communication device 100.

Figure 3:
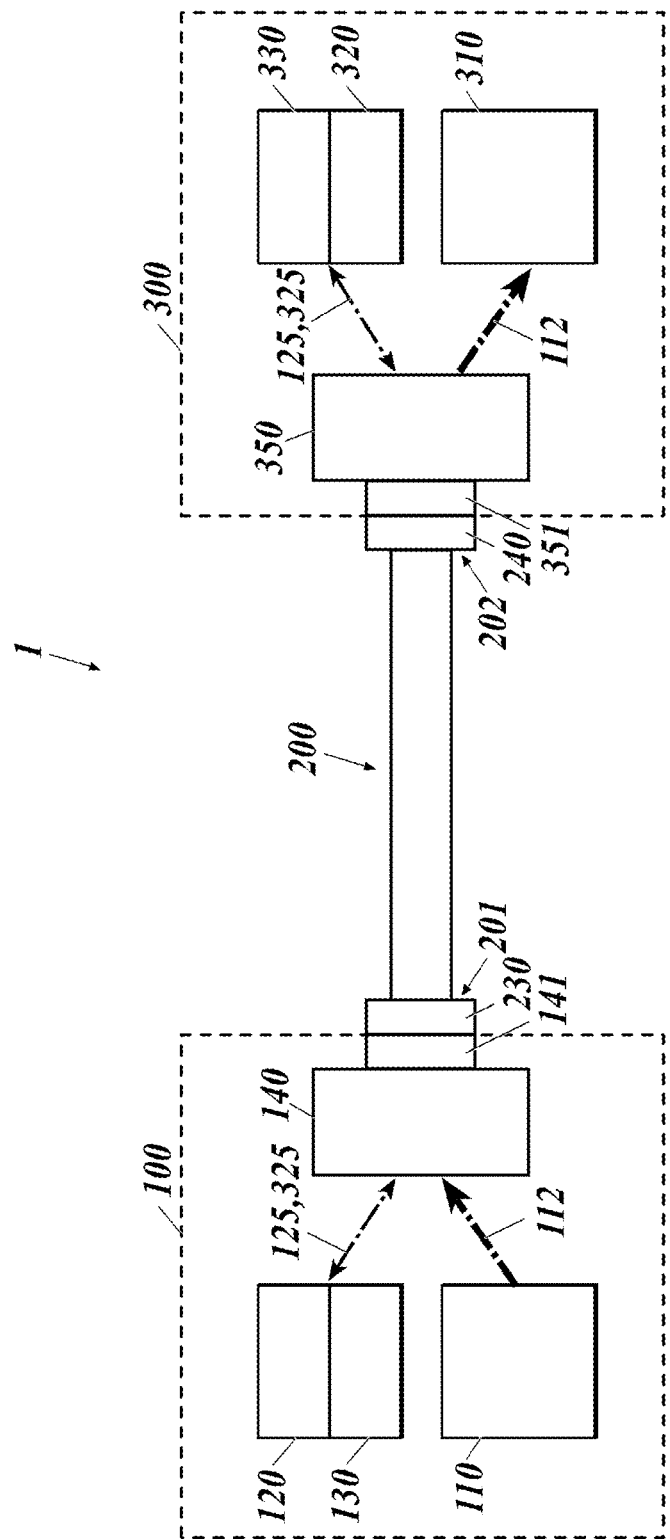
FIG. 3 is a block diagram of the power over fiber system according to the second embodiment of the present disclosure and shows optical connectors and so forth.

As shown in FIG. 3, the first data communication device 100 includes a light input/output part 140 and an optical connector 141 attached to the light input/output part 140, and the second data communication device 300 includes a light input/output part 350 and an optical connector 351 attached to the light input/output part 350. An optical connector 230 provided at the one end 201 of the optical fiber cable 200 is connected to the optical connector 141, and an optical connector 240 provided at the other end 202 of the optical fiber cable 200 is connected to the optical connector 351. The light input/output part 140 guides the feed light 112 to the cladding 220, guides the signal light 125 to the core 210, and guides the signal light 325 to the receiver 130. The light input/output part 350 guides the feed light 112 to the powered device 310, guides the signal light 125 to the receiver 330, and guides the signal light 325 to the core 210.

As described above, the optical fiber cable 200 has the one end 201 connectable to the first data communication device 100 and the other end 202 connectable to the second data communication device 300 to transmit the feed light 112. In this embodiment, the optical fiber cable 200 transmits the signal light 125/325 bidirectionally.

As the semiconductor materials of the semiconductor regions, which exhibit the light-electricity conversion effect, of the semiconductor laser 111 and the photoelectric conversion element 311, any of those described in the first embodiment can be used, thereby achieving a high optical power supply efficiency.

Figure 4:
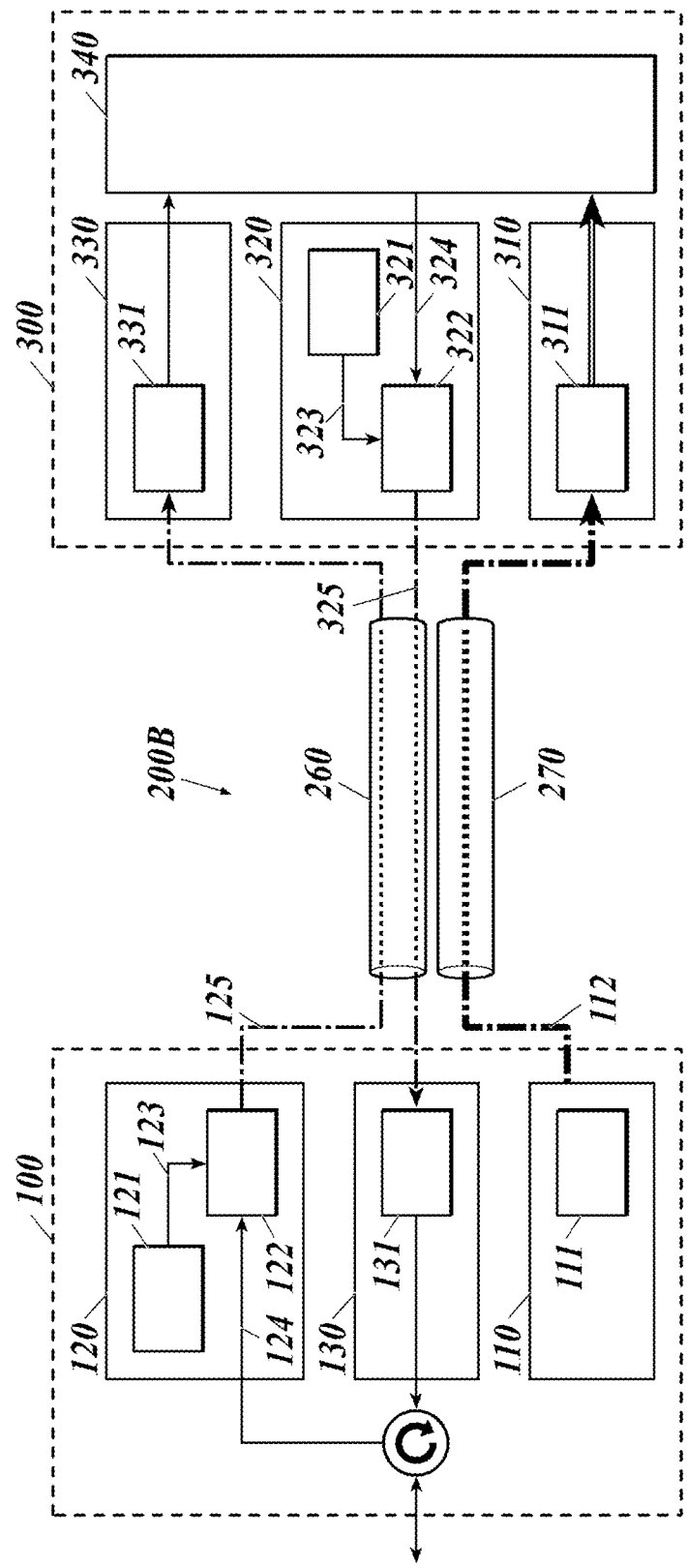
FIG. 4 is a block diagram of a power over fiber system according to another embodiment of the present disclosure.

Like an optical fiber cable 200B of a power over fiber system 1B shown in FIG. 4, an optical fiber 260 that transmits signal light and an optical fiber 270 that transmits feed light may be provided separately. Further, the optical fiber cable 200B may be composed of a plurality of optical fiber cables.

(2) System Including a Plurality of Semiconductor Lasers and/or a Plurality of Photoelectric Conversion Elements Next, there will be described a process of switching semiconductor lasers 111 for power supply included in the power sourcing equipment 110 to activate one of these and a process of switching photoelectric conversion elements 311 included in the powered device 310 to activate one of these for the power over fiber system 1 to perform efficient power supply.

FIRST EXAMPLE

Figure 5:
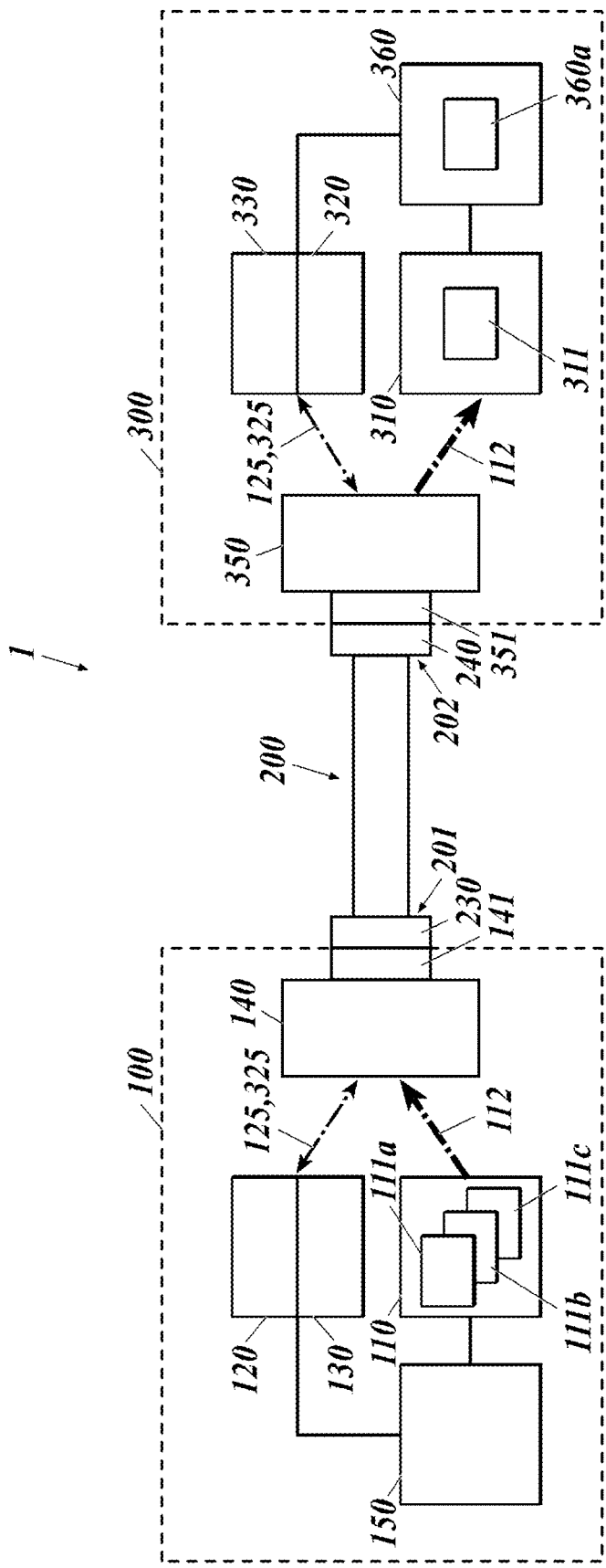
FIG. 5 is a block diagram of the power over fiber system (first example) according to the second embodiment of the present disclosure with a controller(s) (power-receiving-side controller and power-supplying-side controller) added.

The power over fiber system 1 shown in FIG. 5 includes: the first data communication device 100 including the power sourcing equipment 110; the second data communication device 300 including the powered device 310; and the optical fiber cable 200 for the first data communication device 100 and the second data communication device 300 to perform optical communication.

As shown in FIG. 5, the power sourcing equipment 110 included in the first data communication device 100 includes semiconductor lasers 111 for power supply that output the feed light of different wavelengths. The power sourcing equipment 110 of this example includes three semiconductor lasers 111a, 111b, 111c for power supply.

The powered device 310 included in the second data communication device 300 includes a photoelectric conversion element 311 having a predetermined photoelectric conversion efficiency.

The first data communication device 100 includes a power-supplying-side controller 150 that performs the process of switching the semiconductor lasers 111a, 111b, 111c included in the power sourcing equipment 110 to activate one of these.

The second data communication device 300 includes a power-receiving-side controller 360 that performs a process of notifying, by optical communication, the power-supplying-side controller 150 of selection information for selecting and activating one of the semiconductor lasers 111a, 111b, 111c included in the power sourcing equipment 110.

The power-receiving-side controller 360 and the power-supplying-side controller 150 cooperate with one another, thereby functioning as a controller that performs a process of selecting and activating one of the semiconductor lasers 111a, 111b, 111c included in the power sourcing equipment 110 for the power over fiber system 1 to perform power supply of predetermined electric power.

That is, the photoelectric conversion element 311 converts the feed light output by a semiconductor laser (111a, 111b or 111c) selected from among the semiconductor lasers 111a, 111b, 111c included in the power sourcing equipment 110 into electric power, so that predetermined power supply is performed.

For example, in the power over fiber system 1, regularly, the semiconductor lasers 111a, 111b, 111c included in the power sourcing equipment 110 are activated one by one, and the photoelectric conversion element 311 of the powered device 310 converts the feed light output by the respective semiconductor lasers 111a, 111b, 111c into electric power. Then, values of the electric power are compared with one another to select one of the semiconductor lasers 111a, 111b, 111c to be activated as a semiconductor laser for obtaining predetermined electric power, and the selected semiconductor laser is activated so that the power supply of the predetermined electric power is performed.

Next, the process of selecting and activating one of the semiconductor lasers 111a, 111b, 111c included in the power sourcing equipment 110, which is performed in the power over fiber system 1 of this first example, will be described.

For example, at predetermined regular timing, the power-supplying-side controller 150 activates the semiconductor lasers 111a, 111b, 111c included in the power sourcing equipment 110 one by one in order, and sends the feed light output by the respective semiconductor lasers 111a, 111b, 111c to the photoelectric conversion element 311 of the powered device 310.

At the time, the power-supplying-side controller 150 performs a process of notifying, by optical communication, the power-receiving-side controller 360 of information for identifying a semiconductor laser being activated among the semiconductor lasers 111a, 111b, 111c. More specifically, the power-supplying-side controller 150 outputs, as the signal light 125 from the transmitter 120, information for identifying a semiconductor laser being activated, thereby notifying the power-receiving-side controller 360 of the information.

The photoelectric conversion element 311 of the powered device 310 converts the feed light output by the respective semiconductor lasers 111a, 111b, 111c in order into electric power.

Figure 6:
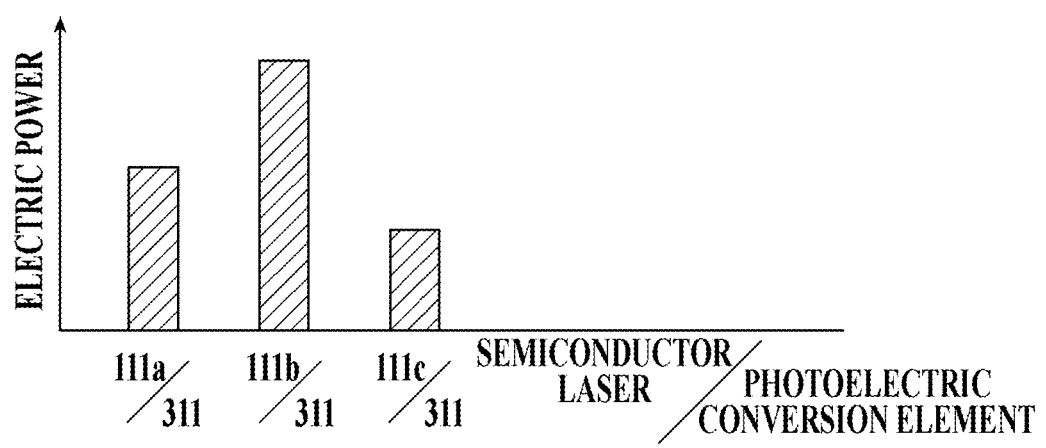
FIG. 6 is a graph to explain electric power data temporarily stored, in the first example.

At the time, on the basis of the information notified by the power-supplying-side controller 150, the power-receiving-side controller 360 performs a process of temporarily storing, in the storage 360a, electric power data corresponding to respective combinations of the semiconductor lasers 111a, 111b, 111c and the photoelectric conversion element 311. For example, as shown in FIG. 6, electric power data corresponding to the combination of the semiconductor laser 111a and the photoelectric conversion element 311, electric power data corresponding to the combination of the semiconductor laser 111b and the photoelectric conversion element 311, and electric power data corresponding to the combination of the semiconductor laser 111c and the photoelectric conversion element 311 are temporarily stored in the storage 360a.

Next, the power-receiving-side controller 360 performs a process of selecting electric power data satisfying a predetermined reference from among the stored electric power data. For example, the power-receiving-side controller 360 selects, as the electric power data satisfying a predetermined reference, the electric power data corresponding to the combination of the semiconductor laser 111b and the photoelectric conversion element 311 from among the three electric power data shown in FIG. 6. The electric power data satisfying a predetermined reference is, for example, data on the electric power needed on the powered device 310 side or data on the maximum electric power obtained on the powered device 310 side.

Next, the power-receiving-side controller 360 performs the process of notifying, by optical communication, the power-supplying-side controller 150 of the selection information for activating the semiconductor laser 111b corresponding to the selected electric power data. More specifically, the power-receiving-side controller 360 outputs, as the signal light 325 from the transmitter 320, the selection information for activating the semiconductor laser 111b, thereby notifying the power-supplying-side controller 150 of the selection information.

Then, on the basis of the selection information notified by the power-receiving-side controller 360, the power-supplying-side controller 150 selects and activates the semiconductor laser 111b among the semiconductor lasers 111a, 111b, 111c included in the power sourcing equipment 110.

In this manner, the power over fiber system 1 performs power supply with, among the semiconductor lasers 111a, 111b, 111c included in the power sourcing equipment 110, the semiconductor laser 111b activated.

Thus, activating the semiconductor laser 111b selected by the controller (power-supplying-side controller 150 and power-receiving-side controller 360) allows the power over fiber system 1 of the first example to perform efficient power supply of predetermined electric power.

SECOND EXAMPLE

Figure 7:
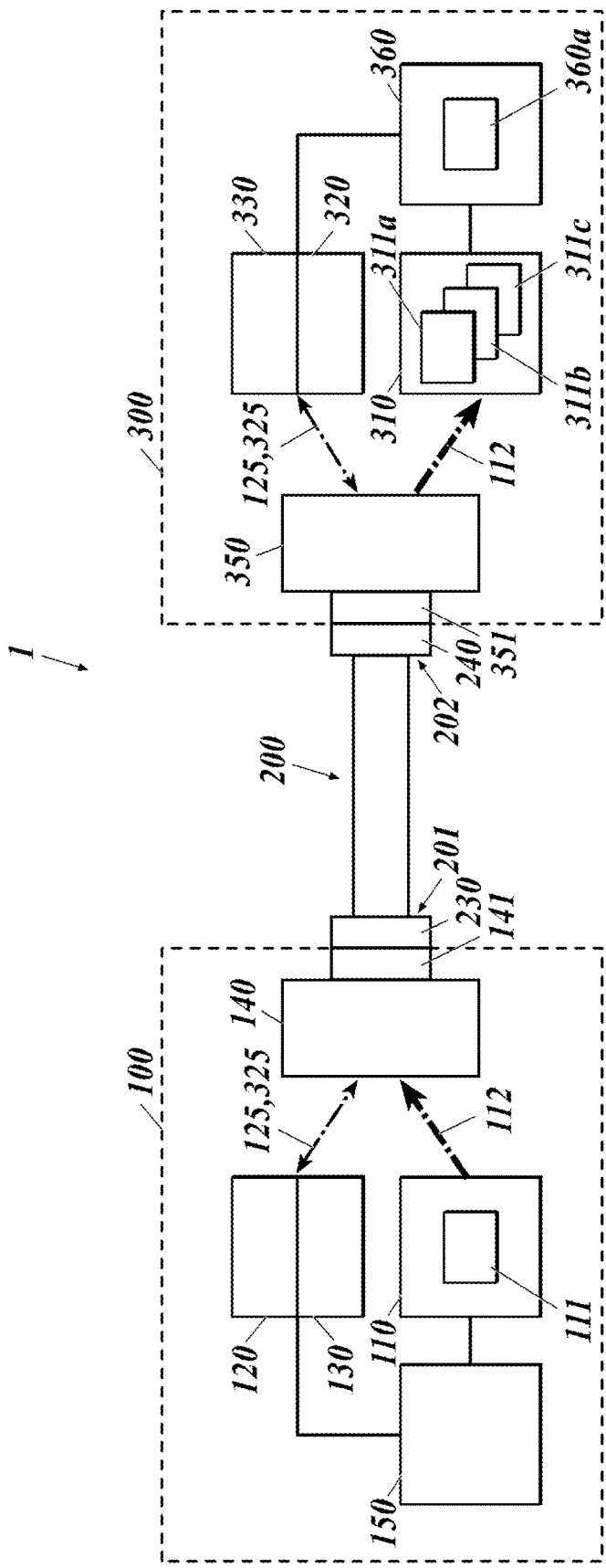
FIG. 7 is a block diagram of the power over fiber system (second example) according to the second embodiment of the present disclosure with the controller(s) (power-receiving-side controller and power-supplying-side controller) added.

The power over fiber system 1 shown in FIG. 7 includes: the first data communication device 100 including the power sourcing equipment 110; the second data communication device 300 including the powered device 310; and the optical fiber cable 200 for the first data communication device 100 and the second data communication device 300 to perform optical communication.

As shown in FIG. 7, the power sourcing equipment 110 included in the first data communication device 100 includes a semiconductor laser 111 for power supply that outputs the feed light of a predetermined wavelength.

The powered device 310 included in the second data communication device 300 includes photoelectric conversion elements 311 having different photoelectric conversion efficiencies. The powered device 310 of this example includes three photoelectric conversion elements 311a, 311b, 311c.

The first data communication device 100 includes the power-supplying-side controller 150 that collectively controls the components of the first data communication device 100.

The second data communication device 300 includes the power-receiving-side controller 360 that performs the process of switching the photoelectric conversion elements 311a, 311b, 311c included in the powered device 310 to select and activate one of these.

The power-receiving-side controller 360 and the power-supplying-side controller 150 cooperate with one another, thereby functioning as the controller that performs a process of selecting and activating one of the photoelectric conversion elements 311a, 311b, 311c included in the powered device 310 for the power over fiber system to perform power supply of predetermined electric power.

That is, a photoelectric conversion element (311a, 311b or 311c) selected from among the photoelectric conversion elements 311a, 311b, 311c included in the powered device 310 converts the feed light output by the semiconductor laser 111 of the power sourcing equipment 110 into electric power, so that predetermined power supply is performed.

For example, in the power over fiber system 1, regularly, the photoelectric conversion elements 311a, 311b, 311c included in the powered device 310 are activated one by one, and each convert the feed light output by the semiconductor laser 111 into electric power. Then, values of the electric power are compared with one another to select one of the photoelectric conversion elements 311a, 311b, 311c to be activated as a photoelectric conversion element for obtaining predetermined electric power, and the selected photoelectric conversion element is activated so that the power supply of the predetermined electric power is performed.

Next, the process of selecting and activating one of the photoelectric conversion elements 311a, 311b, 311c included in the powered device 310, which is performed in the power over fiber system 1 of this second example, will be described.

For example, at predetermined regular timing, the power-supplying-side controller 150 activates the semiconductor laser 111 included in the power sourcing equipment 110, and sends the feed light output by the semiconductor laser 111 to the respective photoelectric conversion elements of the powered device 310.

At the timing, the power-receiving-side controller 360 activates the photoelectric conversion elements 311a, 311b, 311c included in the powered device 310 one by one in order, and the photoelectric conversion elements 311a, 311b, 311c of the powered device 310 each convert the feed light output by the semiconductor laser 111 into electric power.

Figure 8:
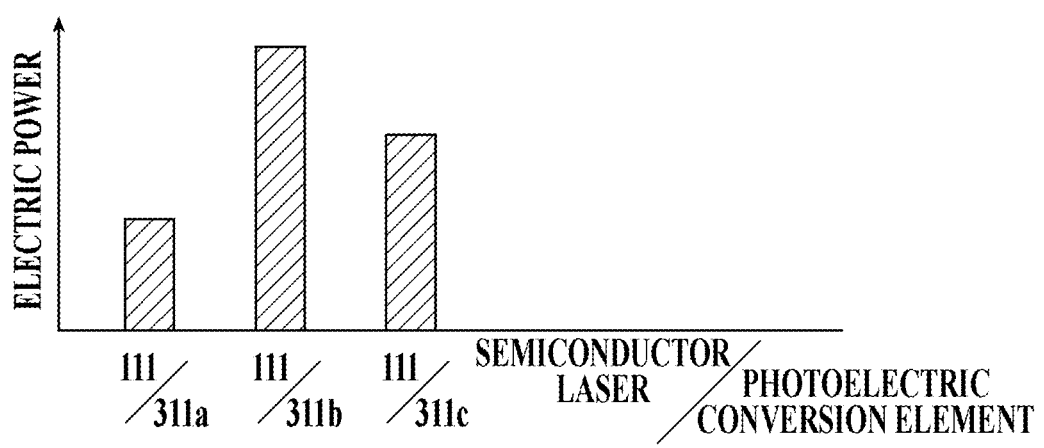
FIG. 8 is a graph to explain the electric power data temporarily stored, in the second example.

At the time, the power-receiving-side controller 360 performs a process of temporarily storing, in the storage 360a, electric power data corresponding to respective combinations of the semiconductor laser 111 of the power sourcing equipment 110 and the photoelectric conversion elements 311a, 311b, 311c. For example, as shown in FIG. 8, electric power data corresponding to the combination of the semiconductor laser 111 and the photoelectric conversion element 311a, electric power data corresponding to the combination of the semiconductor laser 111 and the photoelectric conversion element 311b, and electric power data corresponding to the combination of the semiconductor laser 111 and the photoelectric conversion element 311c are temporarily stored in the storage 360a.

Next, the power-receiving-side controller 360 performs the process of selecting electric power data satisfying a predetermined reference from among the stored electric power data. For example, the power-receiving-side controller 360 selects, as the electric power data satisfying a predetermined reference, the electric power data corresponding to the combination of the semiconductor laser 111 and the photoelectric conversion element 311b from among the three electric power data shown in FIG. 8. The electric power data satisfying a predetermined reference is, for example, data on the electric power needed on the powered device 310 side or data on the maximum electric power obtained on the powered device 310 side.

Next, the power-receiving-side controller 360 performs the process of switching the photoelectric conversion elements to activate the photoelectric conversion element 311b corresponding to the selected electric power data, thereby selecting and activating the photoelectric conversion element 311b among the photoelectric conversion elements 311a, 311b, 311c included in the powered device 310.

In this manner, the power over fiber system 1 performs power supply with, among the photoelectric conversion elements 311a, 311b, 311c included in the powered device 310, the photoelectric conversion element 311b activated.

Thus, activating the photoelectric conversion element 311b selected by the controller (power-supplying-side controller 150 and power-receiving-side controller 360) allows the power over fiber system 1 of the second example to perform efficient power supply of predetermined electric power.

THIRD EXAMPLE

The power over fiber system 1 shown in FIG. 9 includes: the first data communication device 100 including the power sourcing equipment 110; the second data communication device 300 including the powered device 310; and the optical fiber cable 200 for the first data communication device 100 and the second data communication device 300 to perform optical communication.

As shown in FIG. 9, the power sourcing equipment 110 included in the first data communication device 100 includes semiconductor lasers 111 for power supply that output the feed light of different wavelengths. The power sourcing equipment 110 of this example includes three semiconductor lasers 111a, 111b, 111c for power supply.

The powered device 310 included in the second data communication device 300 includes photoelectric conversion elements 311 having different photoelectric conversion efficiencies. The powered device 310 of this example includes three photoelectric conversion elements 311a, 311b, 311c.

The first data communication device 100 includes the power-supplying-side controller 150 that performs the process of switching the semiconductor lasers 111a, 111b, 111c included in the power sourcing equipment 110 to activate one of these.

The second data communication device 300 includes the power-receiving-side controller 360 that performs: the process of notifying, by optical communication, the power-supplying-side controller 150 of the selection information for selecting and activating one of the semiconductor lasers 111a, 111b, 111c included in the power sourcing equipment 110; and the process of switching the photoelectric conversion elements 311a, 311b, 311c included in the powered device 310 to select and activate one of these.

The power-receiving-side controller 360 and the power-supplying-side controller 150 cooperate with one another, thereby functioning as the controller that performs the process of selecting and activating one of the semiconductor lasers 111a, 111b, 111c included in the power sourcing equipment 110 and the process of selecting and activating one of the photoelectric conversion elements 311a, 311b, 311c included in the powered device 310 for the power over fiber system 1 to perform power supply of predetermined electric power.

That is, a photoelectric conversion element (311a, 311b or 311c) selected from among the photoelectric conversion elements 311a, 311b, 311c included in the powered device 310 converts the feed light output by a semiconductor laser (111a, 111b or 111c) selected from among the semiconductor lasers 111a, 111b, 111c included in the power sourcing equipment 110 into electric power, so that predetermined power supply is performed.

For example, in the power over fiber system 1, regularly, the semiconductor lasers 111a, 111b, 111c included in the power sourcing equipment 110 are activated one by one, and also the photoelectric conversion elements 311a, 311b, 311c included in the powered device 310 are activated one by one, and the photoelectric conversion elements 311a, 311b, 311c of the powered device 310 each convert the feed light output by the respective semiconductor lasers 111a, 111b, 111c of the power sourcing equipment 110 into electric power. Then, values of the electric power are compared with one another to select one of the combinations of the semiconductor lasers 111 and the photoelectric conversion elements 311 to be activated as a combination for obtaining predetermined electric power, and the selected combination of the semiconductor laser and the photoelectric conversion element is activated so that the power supply of the predetermined electric power is performed.

Next, the process of selecting and activating one of the semiconductor lasers 111a, 111b, 111c included in the power sourcing equipment 110 and the process of selecting and activating one of the photoelectric conversion elements 311a, 311b, 311c included in the powered device 310, which are performed in the power over fiber system 1 of this third example, will be described.

For example, at predetermined regular timing, the power-supplying-side controller 150 activates the semiconductor lasers 111a, 111b, 111c included in the power sourcing equipment 110 one by one in order, and sends the feed light output by the respective semiconductor lasers 111a, 111b, 111c to the respective photoelectric conversion elements of the powered device 310.

At the time, the power-supplying-side controller 150 performs the process of notifying, by optical communication, the power-receiving-side controller 360 of the information for identifying a semiconductor laser being activated among the semiconductor lasers 111a, 111b, 111c. More specifically, the power-supplying-side controller 150 outputs, as the signal light 125 from the transmitter 120, the information for identifying a semiconductor laser being activated, thereby notifying the power-receiving-side controller 360 of the information.

Also, at the timing, the power-receiving-side controller 360 activates the photoelectric conversion elements 311a, 311b, 311c included in the powered device 310 one by one in order, and the photoelectric conversion elements 311a, 311b, 311c of the powered device 310 each convert the feed light output by the respective semiconductor lasers 111a, 111b, 111c into electric power.

At the time, on the basis of the information notified by the power-supplying-side controller 150, the power-receiving-side controller 360 performs the process of temporarily storing, in the storage 360a, electric power data corresponding to the respective combinations of the semiconductor lasers 111a, 111b, 111c and the photoelectric conversion elements 311a, 311b, 311c. For example, as shown in FIG. 10, electric power data corresponding to the combination of the semiconductor laser 111a and the photoelectric conversion element 311a, electric power data corresponding to the combination of the semiconductor laser 111a and the photoelectric conversion element 311b, electric power data corresponding to the combination of the semiconductor laser 111a and the photoelectric conversion element 311c, electric power data corresponding to the combination of the semiconductor laser 111b and the photoelectric conversion element 311a, electric power data corresponding to the combination of the semiconductor laser 111b and the photoelectric conversion element 311b, electric power data corresponding to the combination of the semiconductor laser 111b and the photoelectric conversion element 311c, electric power data corresponding to the combination of the semiconductor laser 111c and the photoelectric conversion element 311a, electric power data corresponding to the combination of the semiconductor laser 111c and the photoelectric conversion element 311b, and electric power data corresponding to the combination of the semiconductor laser 111c and the photoelectric conversion element 311c are temporarily stored in the storage 360a.

Next, the power-receiving-side controller 360 performs the process of selecting electric power data satisfying a predetermined reference from among the stored electric power data. For example, the power-receiving-side controller 360 selects, as the electric power data satisfying a predetermined reference, the electric power data corresponding to the combination of the semiconductor laser 111b and the photoelectric conversion element 311b from among the nine electric power data shown in FIG. 10. The electric power data satisfying a predetermined reference is, for example, data on the electric power needed on the powered device 310 side or data on the maximum electric power obtained on the powered device 310 side.

Next, the power-receiving-side controller 360 performs the process of notifying, by optical communication, the power-supplying-side controller 150 of the selection information for activating the semiconductor laser 111b corresponding to the selected electric power data. More specifically, the power-receiving-side controller 360 outputs, as the signal light 325 from the transmitter 320, the selection information for activating the semiconductor laser 111b, thereby notifying the power-supplying-side controller 150 of the selection information.

Then, on the basis of the selection information notified by the power-receiving-side controller 360, the power-supplying-side controller 150 selects and activates the semiconductor laser 111b among the semiconductor lasers 111a, 111b, 111c included in the power sourcing equipment 110.

Also, the power-receiving-side controller 360 performs the process of switching the photoelectric conversion elements to activate the photoelectric conversion element 311b corresponding to the selected electric power data, thereby selecting and activating the photoelectric conversion element 311b among the photoelectric conversion elements 311a, 311b, 311c included in the powered device 310.

In this manner, the power over fiber system 1 performs power supply with, among the semiconductor lasers 111a, 111b, 111c included in the power sourcing equipment 110, the semiconductor laser 111b activated, and among the photoelectric conversion elements 311a, 311b, 311c included in the powered device 310, the photoelectric conversion element 311b activated.

Thus, activating the semiconductor laser 111b and the photoelectric conversion element 311b selected by the controller (power-supplying-side controller 150 and power-receiving-side controller 360) allows the power over fiber system 1 of the third example to perform efficient power supply of predetermined electric power.

As described above, even when the power sourcing equipment 110 includes the semiconductor lasers 111a, 111b, 111c that output the feed light of different wavelengths, and/or the powered device 310 includes the photoelectric conversion elements 311a, 311b, 311c having different photoelectric conversion efficiencies, activating the semiconductor laser 111b and/or the photoelectric conversion element 311b selected by the controller (power-supplying-side controller 150 and power-receiving-side controller 360) allows the power over fiber system 1 to perform efficient power supply of predetermined electric power.

In the power over fiber system 1 of the first example and the power over fiber system 1 of the third example described above, the power-supplying-side controller 150 activates the semiconductor lasers 111a, 111b, 111c one by one in order, and sends the feed light output by the respective semiconductor lasers 111a, 111b, 111c to the photoelectric conversion element(s) of the powered device 310, and also the power-supplying-side controller 150 notifies, by optical communication, the power-receiving-side controller 360 of the information for identifying a semiconductor laser being activated, and the power-receiving-side controller 360 thereby identifies the semiconductor laser being activated on the power sourcing equipment 110 side, and stores electric power data corresponding to the respective combinations of the semiconductor lasers and the photoelectric conversion element(s). However, the present invention is not limited thereto.

For example, it is possible that the power-receiving-side controller 360 notifies, by optical communication, the power-supplying-side controller 150 of request information on the order of the semiconductor lasers 111a, 111b, 111c to activate, the power-supplying-side controller 150 activates the semiconductor lasers 111a, 111b, 111c one by one in the requested order notified by the power-receiving-side controller 360, and the power-receiving-side controller 360 identifies a semiconductor laser being activated on the power sourcing equipment 110 side, and stores electric power data corresponding to the respective combinations of the semiconductor lasers and the photoelectric conversion element(s).

Although some embodiments of the present disclosure have been described above, these embodiments are made for purposes of illustration and example only. The present invention can be carried out in various other forms, and each component may be omitted, replaced or modified/changed within a range not departing from the scope of the present invention.

INDUSTRIAL APPLICABILITY

The present invention is configured as described above, and hence can be used as a power over fiber system.

REFERENCE SIGNS LIST

1A Power over Fiber System (Optical Power Supply System)
1 Power over Fiber System (Optical Power Supply System)
1B Power over Fiber System (Optical Power Supply System)
100 First Data Communication Device
110 Power Sourcing Equipment
111 (111a, 111b, 111c) Semiconductor Laser for Power Supply
112 Feed Light
120 Transmitter
125 Signal Light
130 Receiver
140 Light Input/Output Part
141 Optical Connector
150 Power-supplying-side Controller
200A Optical Fiber Cable
200 Optical Fiber Cable
200B Optical Fiber Cable
210 Core
220 Cladding
250A Optical Fiber
250 Optical Fiber
260 Optical Fiber
270 Optical Fiber
300 Second Data Communication Device
311 (311a, 311b, 311c) Powered Device
320 Transmitter
325 Signal Light
330 Receiver
350 Light Input/Output Part
351 Optical Connector
360 Power-receiving-side Controller
360a Storage

The invention claimed is:

1. A power over fiber system, comprising:
a power sourcing equipment including a plurality of semiconductor lasers that oscillate with electric power, thereby outputting feed light;
a powered device including a plurality of photoelectric conversion elements that convert the feed light from the power sourcing equipment into electric power; and
an optical fiber cable that transmits the feed light from the power sourcing equipment to the powered device,
wherein the power sourcing equipment includes the semiconductor lasers that output the feed light of different wavelengths,
wherein the powered device includes the photoelectric conversion elements having different photoelectric conversion efficiencies,
wherein the power over fiber system further comprises a controller that performs
a process of selecting and activating one of the semiconductor lasers included in the power sourcing equipment, and
a process of selecting and activating one of the photoelectric conversion elements included in the powered device to cause the power over fiber system to supply a predetermined power,
wherein the controller includes:
a power-supplying-side controller performing a process of switching the semiconductor lasers included in the power sourcing equipment to activate the one of the semiconductor lasers; and
a power-receiving-side controller performing a process of notifying, by optical communication, the power-supplying-side controller of selection information for activating the one of the semiconductor lasers included in the power sourcing equipment, and a process of switching the photoelectric conversion elements included in the powered device to activate the one of the photoelectric conversion elements,
wherein the power-supplying-side controller further performs a process of activating the semiconductor lasers included in the power sourcing equipment one by one in order, and notifying, by the optical communication, the power-receiving-side controller of information for identifying a semiconductor laser being activated, and
wherein the power-receiving-side controller further performs:
a process of activating the photoelectric conversion elements included in the powered device one by one in order, and temporarily storing electric power data corresponding to respective combinations of the semiconductor lasers and the photoelectric conversion elements, a process of selecting electric power data satisfying a predetermined reference from among the stored electric power data, a process of notifying, by the optical communication, the power-supplying-side controller of the selection information to activate a semiconductor laser corresponding to the selected electric power data, and a process of switching the photoelectric conversion elements to activate a photoelectric conversion element corresponding to the selected electric power data.

2. The power over fiber system according to claim 1, comprising:

a first data communication device including the power sourcing equipment; and a second data communication device including the powered device and performing the optical communication with the first data communication device, wherein the power-supplying-side controller is included in the first data communication device, and the power-receiving-side controller is included in the second data communication device.

3. The power over fiber system according to claim 2, wherein a semiconductor material of each of a semiconductor region of at least one of the semiconductor lasers and a semiconductor region of at least one of the photoelectric conversion elements is a laser medium having a laser wavelength of 500 nm or less, the semiconductor regions exhibiting a light-electricity conversion effect.

4. The power over fiber system according to claim 1, wherein a semiconductor material of each of a semiconductor region of at least one of the semiconductor lasers and a semiconductor region of at least one of the photoelectric conversion elements is a laser medium having a laser wavelength of 500 nm or less, the semiconductor regions exhibiting a light-electricity conversion effect.

5. A power over fiber system, comprising:

a power sourcing equipment including a plurality of semiconductor lasers that oscillate with electric power, thereby outputting feed light;

a powered device including a photoelectric conversion element that converts the feed light from the power sourcing equipment into electric power; and an optical fiber cable that transmits the feed light from the power sourcing equipment to the powered device, wherein the power sourcing equipment includes the semiconductor lasers that output the feed light of different wavelengths, wherein the powered device includes the photoelectric conversion element having a predetermined photoelectric conversion efficiency, wherein the power over fiber system further comprises a controller that performs a process of selecting and activating one of the semiconductor lasers included in the power sourcing equipment to cause the power over fiber system to supply a predetermined power, wherein the controller includes:

a power-supplying-side controller performing a process of switching the semiconductor lasers included in the power sourcing equipment to activate the one of the semiconductor lasers; and a power-receiving-side controller performing a process of notifying, by optical communication, the power-supplying-side controller of selection information for activating the one of the semiconductor lasers included in the power sourcing equipment, wherein the power-supplying-side controller further performs a process of activating the semiconductor lasers included in the power sourcing equipment one by one in order, and notifying, by the optical communication, the power-receiving-side controller of information for identifying a semiconductor laser being activated, and wherein the power-receiving-side controller further performs:

a process of temporarily storing electric power data corresponding to respective combinations of the semiconductor lasers and the photoelectric conversion element, a process of selecting electric power data satisfying a predetermined reference from among the stored electric power data, and a process of notifying, by the optical communication, the power-supplying-side controller of the selection information to activate a semiconductor laser corresponding to the selected electric power data.

6. The power over fiber system according to claim 5, comprising:

a first data communication device including the power sourcing equipment; and a second data communication device including the powered device and performing the optical communication with the first data communication device, wherein the power-supplying-side controller is included in the first data communication device, and the power-receiving-side controller is included in the second data communication device.

7. The power over fiber system according to claim 6, wherein a semiconductor material of each of a semiconductor region of at least one of the semiconductor lasers and a semiconductor region of the photoelectric conversion element is a laser medium having a laser wavelength of 500 nm or less, the semiconductor regions exhibiting a light-electricity conversion effect.

8. The power over fiber system according to claim 5, wherein a semiconductor material of each of a semiconductor region of at least one of the semiconductor lasers and a semiconductor region of the photoelectric conversion element is a laser medium having a laser wavelength of 500 nm or less, the semiconductor regions exhibiting a light-electricity conversion effect.

9. A power over fiber system, comprising:

a power sourcing equipment including a semiconductor laser that oscillates with electric power, thereby outputting feed light;

a powered device including a plurality of photoelectric conversion elements that convert the feed light from the power sourcing equipment into electric power; and an optical fiber cable that transmits the feed light from the power sourcing equipment to the powered device, wherein the power sourcing equipment includes the semiconductor laser that outputs the feed light of a predetermined wavelength, wherein the powered device includes the photoelectric conversion elements having different photoelectric conversion efficiencies, wherein the power over fiber system further comprises a controller that performs a process of selecting and activating one of the photoelectric conversion elements included in the powered device to cause the power over fiber system to supply a predetermined power, wherein the controller includes a power-receiving-side controller performing a process of switching the photoelectric conversion elements included in the powered device to activate the one of the photoelectric conversion elements, and wherein the power-receiving-side controller further performs:
- a process of activating the photoelectric conversion elements included in the powered device one by one in order, and temporarily storing electric power data corresponding to respective combinations of the semiconductor laser of the power sourcing equipment and the photoelectric conversion elements,
- a process of selecting electric power data satisfying a predetermined reference from among the stored electric power data, and
- a process of switching the photoelectric conversion elements to activate a photoelectric conversion element corresponding to the selected electric power data.

10. The power over fiber system according to claim 9, comprising:
- a first data communication device including the power sourcing equipment; and
- a second data communication device including the powered device and performing optical communication with the first data communication device, wherein the power-receiving-side controller is included in the second data communication device.

11. The power over fiber system according to claim 10, wherein a semiconductor material of each of a semiconductor region of the semiconductor laser and a semiconductor region of at least one of the photoelectric conversion elements is a laser medium having a laser wavelength of 500 nm or less, the semiconductor regions exhibiting a light-electricity conversion effect.

12. The power over fiber system according to claim 9, wherein a semiconductor material of each of a semiconductor region of the semiconductor laser and a semiconductor region of at least one of the photoelectric conversion elements is a laser medium having a laser wavelength of 500 nm or less, the semiconductor regions exhibiting a light-electricity conversion effect.

* * * * *